(12) United States Patent
Liu (10) Patent No.: US 9,749,531 B2
(45) Date of Patent: Aug. 29, 2017

(54) ELECTRONIC DEVICE, IMAGE ACQUISITION EQUIPMENT AND IMAGE ACQUISITION CONTROL METHOD

(75) Inventor: Junfeng Liu, Beijing (CN)

(73) Assignees: BEIJING LENOVO SOFTWARE LTD., Beijing (CN); LENOVO (BEIJING) CO., LTD., Beijing (CN)

( * ) Notice: Subject to any disclaimer, the term of this patent is extended or adjusted under 35 U.S.C. 154(b) by 492 days.

(21) Appl. No.: 13/577,849

(22) PCT Filed: Jan. 28, 2011

(86) PCT No.: PCT/CN2011/070754
§ 371 (c)(1),
(2), (4) Date: Aug. 8, 2012

(87) PCT Pub. No.: WO2011/095111
PCT Pub. Date: Aug. 11, 2011

(65) Prior Publication Data
US 2012/0306742 A1   Dec. 6, 2012

(30) Foreign Application Priority Data
Feb. 8, 2010   (CN) .......................... 2010 1 0109947

(51) Int. Cl.
*G06F 3/041* (2006.01)
*H04N 5/232* (2006.01)
*H04N 5/225* (2006.01)

(52) U.S. Cl.
CPC ....... *H04N 5/23245* (2013.01); *H04N 5/2258* (2013.01); *H04N 5/23241* (2013.01)

(58) Field of Classification Search
CPC ............. H04N 5/23245; H04N 5/2258; H04N 5/23241
(Continued)

(56) References Cited

U.S. PATENT DOCUMENTS

2004/0073432 A1*  4/2004  Stone .................... G06F 1/1626
                                                              704/275
2010/0302208 A1* 12/2010  Brosnan et al. .............. 345/175
2011/0274356 A1* 11/2011  Tasdizen .............. G06K 9/4647
                                                              382/195

FOREIGN PATENT DOCUMENTS

CN       1652574       8/2005
CN       1955977 A     5/2007
(Continued)

OTHER PUBLICATIONS

Beijing Lenovo Software Ltd.; PCT/CN2011/070754 filed Jan. 28, 2011; International Preliminary Report on Patentability; mailed Aug. 14, 2012; International Bureau of WIPO; 6 pages.
(Continued)

*Primary Examiner* — Jonathan Boyd
(74) *Attorney, Agent, or Firm* — Dentons US LLP; Peter Su (57) ABSTRACT

Embodiments of the present invention provide an electronic device, image acquisition equipment, and image acquisition control method. The electronic device includes a main board, and an image acquisition equipment and a processor which are connected with the main board, wherein the image acquisition equipment has a first mode and a second mode, the image acquisition equipment including: a first imaging unit array for image acquisition in the first mode; and a second imaging unit array for image acquisition in the second mode; the first imaging unit array and the second imaging unit array are different; an image acquisition control module is set in the processor, and is used for controlling the image acquisition equipment to switch to the first mode or the second mode according to a mode switching instruction. The embodiments of the present invention can realize optimization of all applications, and provide optimal images for every application with a lower computational complexity, a
(Continued)

lower power consumption caused by computation and a higher processing speed.

12 Claims, 4 Drawing Sheets

(58) Field of Classification Search
USPC .......................................................... 345/173
See application file for complete search history.

(56) References Cited

FOREIGN PATENT DOCUMENTS

| | | |
|---|---|---|
| CN | 101022510 | 8/2007 |
| CN | 101840045 | 9/2010 |

OTHER PUBLICATIONS

International Search Report and Preliminary Examination Report corresponding to PCT/CN2011/0707454 dated May 26, 2011.
Chinese Patent Application No. 201010109947.8, Chinese Patent Office, First Office Action mailed on Apr. 27, 2012; 5 pages.
English Text of Chinese Patent Application No. 201010109947.8, Chinese Patent Office, First Office Action mailed on Apr. 27, 2012; 6 pages.

\* cited by examiner

ELECTRONIC DEVICE, IMAGE ACQUISITION EQUIPMENT AND IMAGE ACQUISITION CONTROL METHOD

CROSS REFERENCE TO RELATED APPLICATIONS

This application is a national phase application based on international application number PCT/CN2011/070754, filed Jan. 28, 2011, and claims priority of Chinese Patent Application No. 201010109947.8, filed on Feb. 8, 2010, the contents of both of which are incorporated by reference herein in their entireties.

BACKGROUND

The present invention relates to the field of electronic techniques, and specially, relates to an electronic device, an image acquisition equipment, and an image acquisition control method.

At present, a large number of electronic devices are equipped with image acquisition equipments. Conventional solutions have one of the following shortcomings. There may be just one set of imaging unit array or multiple sets of identical imaging unit arrays (if they are turned on at the same time to acquire images, a stereoscopic image will be obtained) set on an electronic device in the prior art. However, all the imaging units are set for one and the same kind of application, and thus the requirements for other applications cannot be met well.

SUMMARY

An objective of embodiments of the present invention is to provide an electronic device, an image acquisition equipment, and an image acquisition control method, which can meet the requirements of multiple applications.

Embodiments of the present invention provide an electronic device that comprises a main board, and an image acquisition equipment and a processor which are connected with the main board, wherein the image acquisition equipment has a first mode and a second mode, the image acquisition equipment comprising a first imaging unit array for image acquisition in the first mode; and a second imaging unit array for image acquisition in the second mode; the first imaging unit array and the second imaging unit array are different; an image acquisition control module is set in the processor, and is used for controlling the image acquisition equipment to switch to the first mode or the second mode according to a mode switching instruction.

In one embodiment, in the above-mentioned electronic device, at least one of the types, parameters, numbers, distribution densities, and distribution area of the imaging units in the first imaging unit array and the second imaging unit array are different.

In one embodiment, in the above-mentioned electronic device, the image acquisition equipment acquires images presented to the user in the first mode, and the image acquisition equipment acquires images used to calculate a track of a pointing object in the second mode.

In one embodiment, in the above-mentioned electronic device, the second imaging unit array is a part of the first imaging unit array, and when the image acquisition equipment is in the second mode, the imaging units other than the second imaging unit array in the first imaging unit array are in a closed state.

In one embodiment, in the above-mentioned electronic device, the image acquisition equipment further comprising a transparent window set on an image acquisition channel of the second imaging unit array, the transparent window being far away from a first surface of the second imaging unit array and being spaced from the second imaging unit array by a certain distance, so that there is formed a space; at least one light-emitting device for illuminating a light onto the space, and connected with the main board; and the light-emitting device and the second imaging unit array are located on the same side of the first surface.

Embodiments of the present invention also provide an image acquisition equipment that has a first mode and a second mode, the image acquisition equipment comprising a first imaging unit array for image acquisition in the first mode; and a second imaging unit array for image acquisition in the second mode, the first imaging unit array and the second imaging unit array being different.

In one embodiment, in the above-mentioned image acquisition equipment, at least one of the types, numbers, distribution densities, and distribution area of the imaging units in the first imaging unit array and the second imaging unit array are different.

In one embodiment, in the above-mentioned image acquisition equipment: a plurality of subarrays, which are independent of each other in physical positions, are comprised in the second imaging unit array; or a plurality of subarrays, which are independent of each other in physical positions and surround subarrays in the first imaging unit array, are comprised in the second imaging unit array.

Preferably, in the above-mentioned image acquisition equipment, the second imaging unit array is a part of the first imaging unit array, and when the image acquisition equipment is in the second mode, the imaging units other than the second imaging unit array in the first imaging unit array are in a closed state.

In one embodiment, in the above-mentioned image acquisition equipment, there is further including a transparent window set on an image acquisition channel of the second imaging unit array, the transparent window being far away from a first surface of the second imaging unit array and being spaced from the second imaging unit array by a certain distance, so that there is formed a space; at least one light-emitting device for illuminating a light onto the space, and connected with the main board; and the light-emitting device and the second imaging unit array are located on the same side of the first surface.

Embodiments of the present invention also provide an image acquisition control method of an electronic device having an image acquisition equipment that comprises receiving a mode switching instruction; controlling the image acquisition equipment to carry out image acquisition by a first imaging unit array in the image acquisition equipment when the mode switching instruction indicates that the image acquisition equipment is switched to a first mode; controlling the image acquisition equipment to rarity out the image acquisition by a second imaging unit array in the image acquisition equipment when the mode switching instruction indicates that the image acquisition equipment is switched to a second mode; wherein the first imaging unit array and the second imaging unit array are different.

In one embodiment, in the above-mentioned image acquisition control method, the mode switching instruction is generated by the electronic device according to an acquired switching parameter.

The embodiments of the present invention may have the following beneficial effects:

Relatively to prior solutions in which one and the same set of imaging unit array is used for corresponding to these applications, different imaging unit arrays are used to provide images in different modes in the embodiments of the present invention, and therefore, optimization of all applications can be realized, that is to say, optimal images can be provided for every application.

Relatively to prior solutions in which one and the same set of imaging unit array is used for corresponding to all applications, an array with a small number of the imaging units is used for carrying out acquisition of images, which are provided for applications with relative low requirements on the image qualities, in the embodiments of the present invention, so that the number of the imaging units participating in the acquisition of images is reduced in partial modes, and therefore the power consumption can be decreased. Meanwhile, because of the reduction of the image data, the calculation amount can be decreased, the power consumption caused by the calculation can be reduced, and the processing speed can be accelerated.

DETAILED DESCRIPTION

In the embodiments of the present invention, an image acquisition equipment can be operated in a plurality of operating modes, and there is set a corresponding imaging unit array corresponding to each of operating modes, in each of which the corresponding imaging unit array carries out image acquisition. Therefore, the technical problem of poor effect caused by applying a single imaging unit array to several manners is avoided.

Figure 1:
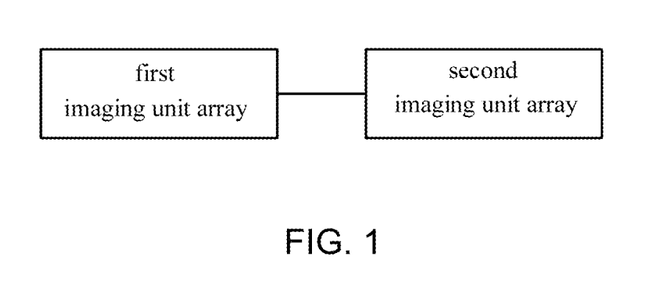
FIG. 1 is a schematic diagram of the structure of an image acquisition equipment.

An electronic device according to the embodiments of the present invention includes a main board, and an image acquisition equipment and a processor which are connected with the main board, wherein the image acquisition equipment has a first mode and a second mode, as shown in the FIG. 1, the image acquisition equipment includes:

a first imaging unit array for image acquisition in the first mode; and a second imaging unit array for image acquisition in the second mode;

the first imaging unit array and the second imaging unit array are different;

an image acquisition control module is set in the processor, and is used for controlling the image acquisition equipment to switch to the first mode or the second mode according to a mode switching instruction.

In particular embodiments of the present invention, the electronic device may be various electronic devices such as a cell phone, a PDA, a portable computer, or a desktop computer.

If the electronic device is a desktop computer, the image acquisition equipment may be set either on a display, or of course inside a computer case with lens sticking out of the computer case.

In the particular embodiments of the present invention, the first mode and the second mode may be respectively a variety of different modes such as:

a mode for acquiring images presented to a user and a mode for acquiring images used to calculate a track of a pointing object; or a mode for acquiring the images presented to the user and a mode for acquiring images used to calculate illumination intensity; or a mode for acquiring the images presented to the user and a mode for acquiring images used for face recognition; or a mode for acquiring the images used to calculate the illumination intensity and the mode for acquiring the images used for the face recognition.

Of course, the various modes mentioned above are given only by way of examples, and there are many similar application modes of the image acquisition equipment, which will not be enumerated herein. However it should be known that the requirements that the above-mentioned various modes make on the qualities and sizes of images are all different, and thus a variety of problems such as power consumption, time delay and the like will be caused inevitably if one set of imaging unit array is employed for corresponding to different application modes, which will be illustrated as follows.

As for the problem of the power consumption of the image acquisition equipment, for example, the number of the imaging units that are necessary for acquiring the images used to calculate the illumination intensity is less as compared with the number of the imaging units that are necessary for the user to take pictures. However, one and the same set of imaging unit array is used for corresponding to these applications in the prior art, which will inevitably cause unnecessary energy consumption in the mode for acquiring the images used to calculate the illumination intensity.

As for the problem of the power consumption of a calculation module, for example, when acquiring the images used to calculate the illumination intensity, the bigger the pixels of the acquired images are, the more the calculation amount that is necessary to perform for calculating the illumination intensity according to the images is, and the smaller the pixels of the acquired images are, the less the calculation amount that is necessary to perform for calculating the illumination intensity according to the images is. However, one and the same set of imaging unit array is used for corresponding to these applications in the prior art, which will inevitably cause the fact that the qualities of the acquired images will satisfy the most demanding application, while as for other applications with relative low requirements on the image qualities, the unnecessary calculation amount will be increased and the unnecessary power consumption will be incurred.

As for the problem of the time delay, in view of the fact that the higher the image qualities are, the longer the time that a calculation device spent on calculation is, therefore acquiring the images having high qualities that are unnecessary will also bring in the increasing of the processing time.

The above-mentioned problems can be avoided by utilizing the embodiments of the present invention accordingly, which will be illustrated as follows.

As for the problem of the power consumption of the image acquisition equipment, for example, the number of the imaging units that are necessary for acquiring the images used to calculate the illumination intensity is less as compared with the number of the imaging units that are necessary for the user to take pictures. An array with a small number of the imaging units is used for carrying out the image acquisition in the embodiments of the present invention. As compared with the prior art in which one and the same set of imaging unit array (which has a large number of the imaging units in consideration of the shooting of the user) is used for corresponding to these applications, the number of the imaging units that are necessary for participating in acquisition of the images used to calculate the illumination intensity is reduced, and therefore the power consumption can be decreased.

As for the problem of the power consumption of the calculation module, for example, when acquiring the images used to calculate the illumination intensity, the bigger the pixels of the acquired images are, the more the calculation amount that is necessary to perform for calculating the illumination intensity according to the images is, and the smaller the pixels of the acquired images are, the less the calculation amount that is necessary to perform for calculating the illumination intensity according to the images is. An array with a small number of the imaging units is used for carrying out the image acquisition in the embodiments of the present invention. As compared with the prior art in which one and the same set of imaging unit array (which has a large number of the imaging units in consideration of the shooting of the user) is used for corresponding to these applications, because of the reduction of the image data, the calculation amount can be decreased, the power consumption caused by the calculation can be reduced, and at the same time, the processing speed can be accelerated.

As for the problem of application optimization, one and the same set of imaging unit array (which has a large number of the imaging units in consideration of the shooting of the user) is used for corresponding to these applications in the prior art, and thus only a part of applications' optimization can be realized. However, different imaging unit arrays are corresponded in different modes in the embodiments of the present invention, and therefore, optimization of all applications can be realized, that is to say, optimal images can be provided for every application.

It has been mentioned in the particular embodiments of the present invention that the image acquisition equipment includes the first imaging unit array and the second imaging unit array that are different, and various implementation will be illustrated in detail below.

<The First Implementation>

In the first implementation, the types of the imaging units in the first imaging unit array and the second imaging unit array are different. For example, the first imaging unit array is a CCD (Charge Couple Device) imaging unit array, and the second imaging unit array is a CMOS (Complementary Metal-Oxide Semiconductor) imaging unit array.

CCD is a mature technique with good imaging quality, but its power consumption amount is large; while, relatively speaking, CMOS is a technique with low price, simple manufacturing process, and low amount of power consumption, but it will generate heat during the frequent starting procedure because of the changeful current, which will cause clutters and affect the qualities of images.

Because of their difference, they must be suitable for different application scenarios (operating modes), and thus the images having the best effects in various modes can be obtained by employing different types of imaging unit arrays for corresponding to different operating modes.

<The Second Implementation>

In the first implementation, the types of the imaging units in the first imaging unit array and the second imaging unit array are different. However, it should be understood that the first imaging unit array and the second imaging unit array can employ the imaging units of the same type, but the parameters of the imaging units are different.

For example, as for the CCD imaging units, the smaller the unit area of the imaging unit is, the more the number of the imaging units that can be arranged in the same area are, and thus the higher the pixels of the acquired images are. However, the overall sensitivity and dynamic range will be affected and thus the qualities of images will be affected.

With respect to the above-mentioned case, the first imaging unit array (the imagine unit thereof having smaller unit area) can be used in the mode with high requirement on pixels, and the second imaging unit array (the imaging unit thereof having larger unit area) can be used in the mode with high requirement on image qualities.

<The Third Implementation>

In the third implementation, the numbers of the imaging units in the first imaging unit array and the second imaging unit array are different.

To guarantee that the numbers of the imaging units in the first imaging unit array and the second imaging unit array are different, it can be realized by employing various manners such as:

the area of the first imaging unit array and the second imaging unit array are the same, but the distribution densities of the imaging units in the first imaging unit array and the second imaging unit array are different; or the distribution densities of the imaging units in the first imaging unit array and the second imaging unit array are the same, but the area of the first imaging unit array and the second imaging unit array are different; or the distribution densities of the imaging units in the first imaging unit array and the second imaging unit array are different, and the area of the first imaging unit array and the second imaging unit array are different.

Because of the different numbers, the power consumption of the first imaging unit array and the second imaging unit array are different. For example, it will not need too many imaging units for the measurement of the illumination intensity, thus the number of the second imaging units is small. Therefore, only the second imaging unit array is operated in the case of the illumination intensity measurement, which decreases the power consumption of the system.

Of course, it should be understood that the above-mentioned types, parameters, numbers, distribution densities, distribution area, and so on can be used in combination in order to obtain different imaging unit arrays for accommodating different application modes.

Figure 2:
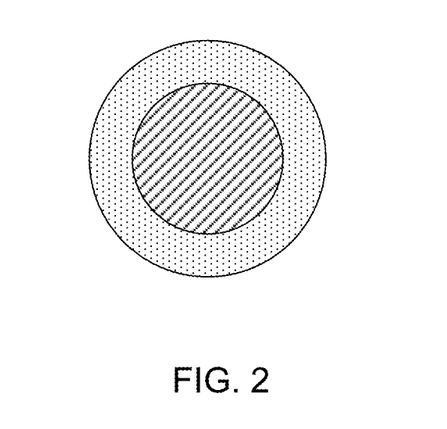
FIGS. 2 to 4 are schematic diagrams of arrangement manners of a first imaging unit array and a second imaging unit array in the image acquisition equipment.
Figure 3:
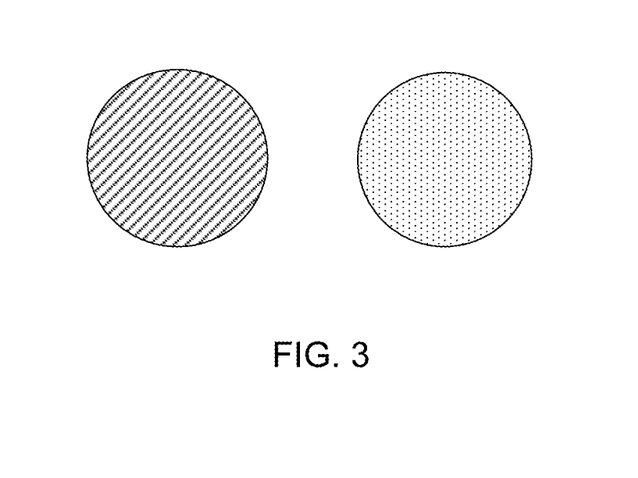
Figure 4:
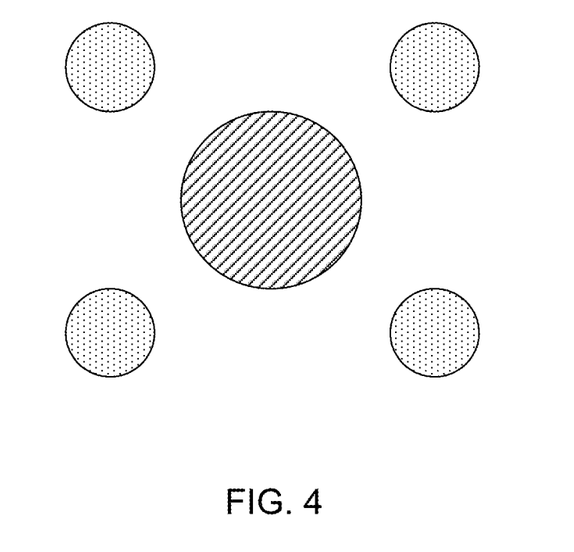

With respect to the various possible implementations mentioned above, the first imaging unit array and the second imaging unit array can be arranged in a variety of manners such as:

as shown in FIG. 2, the second imaging unit array is of an annular shape, and the inner edge of the second imaging unit array is set adjacent to the outer edge of the first imaging unit array;

as shown in FIG. 3, the second imaging unit array and the first imaging unit array are set at intervals;

as shown in FIG. 4, the second imaging unit array includes many subarrays which are independent of each other in the physical positions, and these subarrays are set on the periphery of the first imaging unit array.

Of course, in the various manner mentioned above, when the number of the imaging units in the first imaging unit array is larger than that in the second imaging unit array, the second imaging unit array may be a part of the first imaging unit array. Moreover, when the image acquisition equipment is in the second mode, the imaging units other than the second imaging unit array in the first imaging unit array are in a closed state.

The above-mentioned implementation in which the second imaging unit array may be a part of the first imaging unit array will be illustrated below as follows.

Figure 5:
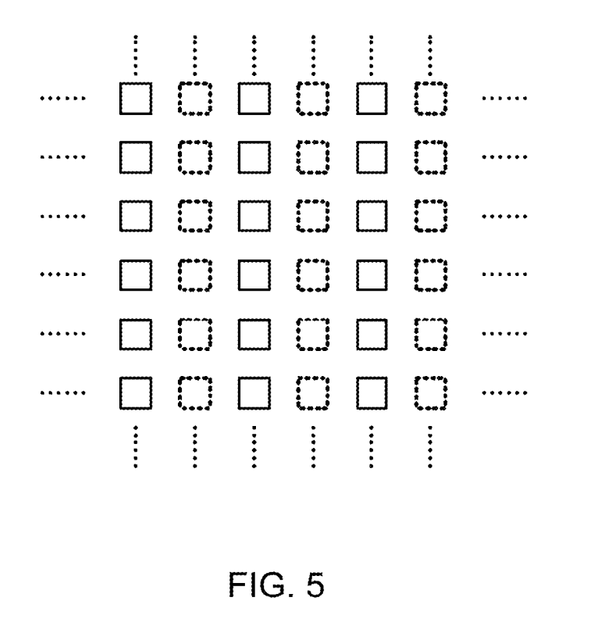
FIG. 5 is a schematic diagram showing that the second imaging unit array is a part of the first imaging unit array in the image acquisition equipment.

As shown in FIG. 5, a box therein represents one imaging unit, the imaging units represented by dotted-line boxes therein form the second imaging unit array, and the imaging units represented by the dotted-line bows together with those represented by solid-line box form the first imaging unit array.

Of course, FIG. 5 is only one possible manner, in which the number of the imaging units in the second imaging unit array may also be more or less, and at the same time, the imaging units forming the second imaging unit array may also be disposed in other manners.

In the case that the second imaging unit array is a part of the first imaging unit array, power supplies that are independent of each other may be set for the second imaging unit array and the first imaging unit array. At this time, in the second mode, the imaging units other than the second imaging unit array in the first imaging unit array will not be supplied with power and will be in a closed state.

Of course, controllers that are independent of each other may be set for the second imaging unit array and the first imaging unit array, and it is controlled by the controllers whether the second imaging unit array and the first imaging unit array are operated. In the second mode, the imaging units in the second imaging unit array are controlled to be turned on by the corresponding controller, while the imaging units other than the second imaging unit array in the first imaging unit array are controlled to be turned off.

Of course, in any mode, the first imaging unit array is allowed to be an operating state. Moreover, signals of imaging units are selected according to the mode that the image acquisition equipment is currently in, and then corresponding images are formed.

In the particular embodiments of the present invention, the image acquisition equipment acquires images presented to the user in the first mode, and the image acquisition equipment acquires images used to calculate the track of the pointing object in the second mode.

In this case, the image acquisition equipment further includes:

a transparent window set on an image acquisition channel of the second imaging unit array, the transparent window being far away from a first surface of the second imaging unit array and being spaced from the second imaging unit array by a certain distance, so that there is formed a space;

at least one light-emitting device for illuminating a light onto the space, and connected with the main board;

the light-emitting device and the second imaging unit array being located on the same side of the first surface.

In the particular embodiments of the present invention, the light-emitting device is fixed or adjustable, which will be illustrated as follows.

Figure 6:
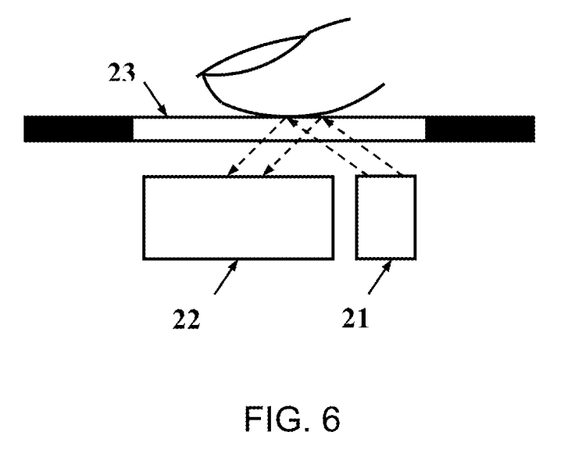
FIGS. 6 to 9 are schematic diagrams of possible relative position relationships between a fixed light-emitting device, the second imaging unit array, and a transparent window when there is set the light-emitting device in embodiments of present invention.

As shown in FIG. 6, the light-emitting device 21 is fixed and the direction in which the light is emitted is directed to the transparent window 23.

The light that the light-emitting device 21 emits is illuminated onto a finger that touches an external surface of the transparent window 23, and reflected into the second imaging unit array 22 which forms an image for recording the position of the finger.

Figure 7:
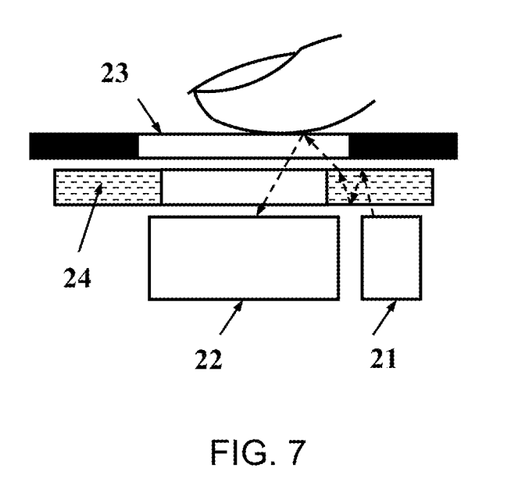

As shown in FIG. 7, the light-emitting device 21 is fixed, and the portable electronic device further includes an optical element 24 which is set in the direction on which the light-emitting device 21 emits the light and used to direct the light emitted by the light-emitting device 21 to the space.

After multiple reflections inside the optical element 24, the light that the light-emitting device 21 emits is ejected out of the optical element 24, illuminated onto the finger that touches the external surface of the transparent window 23, and reflected into the second imaging unit array 22 which forms the image for recording the position of the finger.

Figure 8:
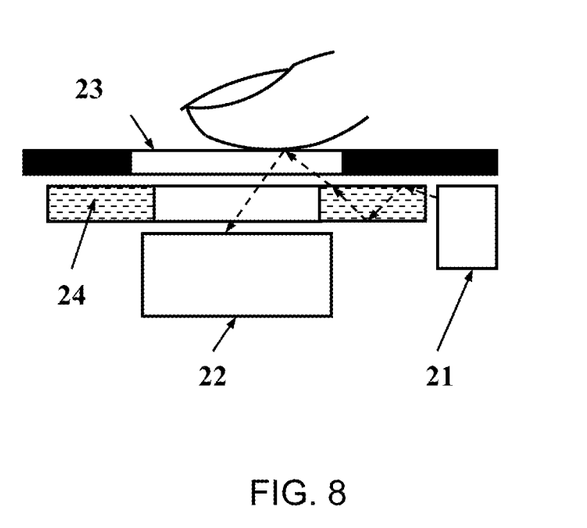

In FIG. 7, the light-emitting device 21 is set below the optical element 24. However, the relative position between them may be in other forms. As shown in FIG. 8, the light-emitting device 21 is fixed, and the portable electronic device further includes an optical element 24 which is set in the direction that the light-emitting device 21 emits the light (the optical element 24 is set on the left of the light-emitting device 21) and used to direct the light emitted by the light-emitting device 21 to the space.

After multiple reflections inside the optical element 24, the light that the light-emitting device 21 emits is ejected out of the optical element 24, illuminated onto the finger that touches the external surface of the transparent window 23, and reflected into the second imaging unit array 22 which forms the image for recording the position of the finger.

Figure 9:
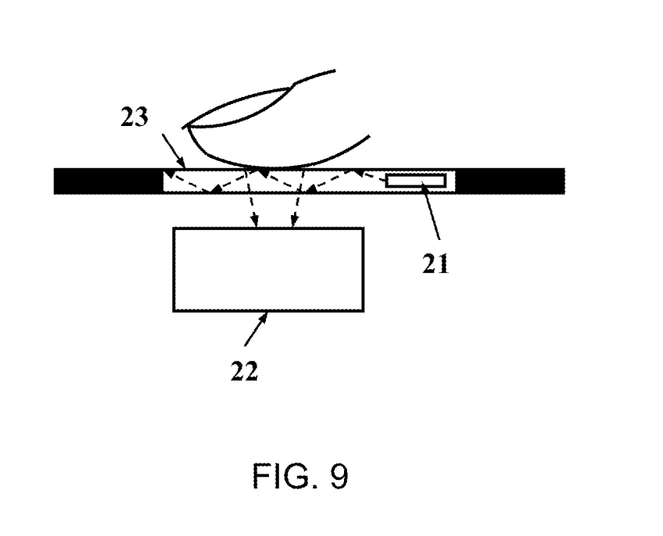

In all of the various implementations of FIGS. 6 to 8, the light-emitting device is located outside the transparent window, and the light-emitting device and the second imaging unit array are located on the same side of the transparent window. However, the light-emitting device may be also set inside the transparent window. As shown in FIG. 9, the light-emitting device 21 is set inside the transparent window 23, and located on one end of the transparent window 23. The direction in which the light is emitted is directed to the other end of the transparent window 23.

After the light beam that the light-emitting device 21 emits is illuminated from the cross section of the transparent window 23 to its interior (i.e., the internal surface of the transparent window 23), a reflection will appear. If the surface layer of the transparent protection layer is air, the light will be subjected to a total reflection on the surface of the transparent protection layer when the angle of the incident light satisfies a certain condition. However, if the external surface of the transparent window 23 is pressed by a matter (such as a finger) having a relatively high refractive index, the condition under which there is be a total reflection on the surface of the transparent window 23 will be overruled, and then a part of the light will be passed through the surface and projected onto the surface of the finger. The light will be subjected to a scattering (a diffuse reflection) due to the accidented surface of the finger, and after being passed through the transparent window 23, the scattered light will reach the second imaging unit array 22 which forms the image for recording the position of the finger.

In the embodiments of the present invention, the image of the pointing object on the surface of the transparent window is shot by utilizing the second imaging unit array, and then analyzed in order to determine the position of the pointing object. No additional device is added, its implementation cost is low, and it is of great importance for small-scale portable devices.

In the embodiments of the present invention, since the pointing object is not sliding on the surface of the touch screen, but is operating on the transparent window, it will not affect the user when he/she is watching displayed contents.

An image acquisition control method of an electronic device having an image acquisition equipment according to the embodiments of the present invention includes:

receiving a mode switching instruction;

controlling the image acquisition equipment to carry out image acquisition by a first imaging unit array in the image acquisition equipment when the mode switching instruction indicates that the image acquisition equipment is switched to a first mode;

controlling the image acquisition equipment to carry out the image acquisition by a second imaging unit array in the image acquisition equipment when the mode switching instruction indicates that the image acquisition equipment is switched to a second mode;

the first imaging unit array and the second imaging unit array are different.

The mode switching instruction may be an instruction that a user gives by using a hardware switch set on the surface of the electronic device, or an instruction that a use inputs by using a software module, or else an instruction that a user gives by pressing a specific key on a keyboard.

Of course, the mode switching instruction may also be generated by the system according to an acquired switching parameter, which will be illustrated as follows.

Assume the electronic device is a portable terminal, the first mode of the image acquisition equipment is a mode for acquiring images used for face recognition, and the second mode is a mode for acquiring images used to calculate illumination intensity.

The portable terminal is in the first mode when it is booted or woken up. At this time, the first imaging unit array having good imaging quality is operated so as to acquire images and be used for the face recognition.

After authentication of the recognition, the portable terminal is started and enters an operating state. At this time, the switching parameter (for example, whether a specific program is started, or whether a specific program is closed (e.g., a security login software is closed)) is acquired. And when the switching parameter indicates that a switching condition is true, the mode switching instruction is generated to indicate the switching to the second mode.

In the second mode, the second imaging unit array having poor imaging quality is operated so as to acquire images and carry out analysis according to the acquire images, in order to automatically adjust the brightness of screen backlight.

The above-mentioned contents are given only by way of examples. The switching parameters are different from each other for various different modes. They may be set previously according to the various particular modes, which will not be illustrated herein.

Meanwhile, in the particular embodiments of the present invention, since the portable electronic device has small space, in order to reduce occupation on the space of the portable electronic device as much as possible, the image acquisition equipment is designed in the manner of one module, that is to say, a plurality of imaging unit arrays are located on one module, and the image acquisition equipment is connected with the main board via a uniform interface, instead of being rendered as a plurality of image acquisition sub-equipments.

Meanwhile, in accordance with different applications, the multiple sets of imaging unit arrays may either share lens, or employ lens independent of each other so as to meet their different requirements.

In the embodiments of the present invention, the image acquisition equipment can be operated in a plurality of operating modes, and there is set a corresponding imaging unit array corresponding to each of operating modes, in each of which the corresponding imaging unit array carries out image acquisition. Therefore, the technical problem of poor effect caused by applying a single imaging unit array to several manners is avoided.

For example, the first imaging unit array (the imaging unit thereof having smaller unit area) is applied in the mode with high requirement on pixels, and the second imaging unit array (the imaging unit thereof having larger unit area) is applied in the mode with high requirement on image qualities, so that the requirements of different applications is able to be met. If one and the same imaging unit array is solely used, only one requirement of applications (e.g., the requirement on pixel or picture quality), rather than both of them, can be met.

Meanwhile, when corresponding imaging unit arrays are utilized to carry out image acquisition, unnecessary energy consumption will be avoided for some undemanding application requirements since corresponding imaging unit arrays are used to can out image acquisition.

The above-mentioned is only the preferred implementations for carrying out the invention. It should be pointed out that, for those having ordinary skills in this technical field, on the condition of not deviating from the principle mentioned in the present invention, several improvements and refinements can be made as well, which should be also treated as the scope protected by the present invention.

What is claimed is:

1. An electronic device, wherein the electronic device comprises a main board; an image acquisition equipment; and a processor coupled to the main board, the image acquisition equipment has a first mode and a second mode, and the image acquisition equipment comprises:

a first imaging unit array for image acquisition in the first mode; and a second imaging unit array for image acquisition in the second mode, the first imaging unit array and the second imaging unit array being different;

an image acquisition control module is configured to control the image acquisition equipment and switch to the first mode or the second mode according to a mode switching instruction, and at least one light-emitting device connected with the main board;

wherein in the first mode, the image acquisition equipment acquires images used for face recognition, in the second mode, the image acquisition equipment acquires images used to calculate a track of a finger on the electronic device; and the at least one light-emitting device is used for illuminating a light to space, wherein in the first mode, the light is used for acquiring images used for face recognition, in the second mode, the light is used for tracking the finger on the electronic device.

2. The electronic device of claim 1, wherein at least one of the types, parameters, numbers, distribution densities, and distribution areas of the imaging units in the first imaging unit array and the second imaging unit array are different.

3. The electronic device of claim 1, wherein the second imaging unit array is to part of the first imaging unit array, and when the image acquisition equipment is in the second mode, the imaging units other than the second imaging unit array in the first imaging unit array are in a closed state.

4. The electronic device of claim 1, wherein the image acquisition equipment further comprises:
a transparent window set on an image acquisition channel of the second imaging unit array, the transparent window being spaced from the second imaging unit array by a certain distance, so that there is formed a space; and
the light-emitting device and the second imaging unit array are located on the same side of the first surface.

5. An image acquisition equipment, wherein the image acquisition equipment has a first mode and a second mode, and the image acquisition equipment comprises:
a first imaging unit array for image acquisition in the first mode; and
a second imaging unit array for image acquisition in the second mode, the first imaging unit array and the second imaging unit array being different, and
at least one light-emitting device connected with the main board;
wherein in the first mode, the image acquisition equipment acquires images used for face recognition,
in the second mode, the image acquisition equipment acquires images used to calculate a track of a finger on the electronic device; and
the at least one light-emitting device is used for illuminating a light to space,
wherein in the first mode, the light is used for acquiring images used for face recognition,
in the second mode, the light is used for tracking the finger on the electronic device.

6. The image acquisition equipment of claim 5, wherein at least one of the types, numbers, distribution densities, and distribution areas of the imaging units in the first imaging unit array and the second imaging unit array are different.

7. The image acquisition equipment of claim 5, wherein the second imaging unit array comprises a plurality of subarrays that are independent of each other in physical positions.

8. The image acquisition equipment of claim 5, wherein the second imaging unit array comprises a plurality of subarrays that are independent of each other in physical positions and surround subarrays in the first imaging unit array.

9. The image acquisition equipment of claim 5, wherein the second imaging unit array is a part of the first imaging unit array, and when the image acquisition equipment is in the second mode, the imaging units other than the second imaging unit array in the first imaging unit array are in a closed state.

10. The image acquisition equipment of claim 5, further comprises:
a transparent window set on an image acquisition channel of the second imaging unit array, the transparent window being spaced from the second imaging unit array by a certain distance, so that there is formed a space; and
the light-emitting device and the second imaging unit array are located on the same side of the first surface.

11. An image acquisition control method of an electronic device having an image acquisition equipment, wherein the image acquisition control method comprises:
receiving a mode switching instruction;
controlling the image acquisition equipment to carry out image acquisition by a first imaging unit array in the image acquisition equipment when the mode switching instruction indicates that the image acquisition equipment is switched to a first mode;
controlling the image acquisition equipment to cam out the image acquisition by a second imaging unit array in the image acquisition equipment when the mode switching instruction indicates that the image acquisition equipment is switched to a second mode;
wherein,
the first imaging unit array and the second imaging unit array are different, and
in the first mode, the image acquisition equipment acquires images used for face recognition,
in the second mode, the image acquisition equipment acquires images used to calculate a track of a finger on the electronic device; and
the at least one light-emitting device is used for illuminating a light to space,
wherein in the first mode, the light is used for acquiring images used for face recognition,
in the second mode, the light is used for tracking the finger on the electronic device.

12. The image acquisition control method of claim 11, wherein the mode switching instruction is generated by the electronic device according to an acquired switching parameter.

* * * * *